Feb. 12, 1924.
W. J. HAMILTON
TRAP
Filed Dec. 14, 1922
1,483,800
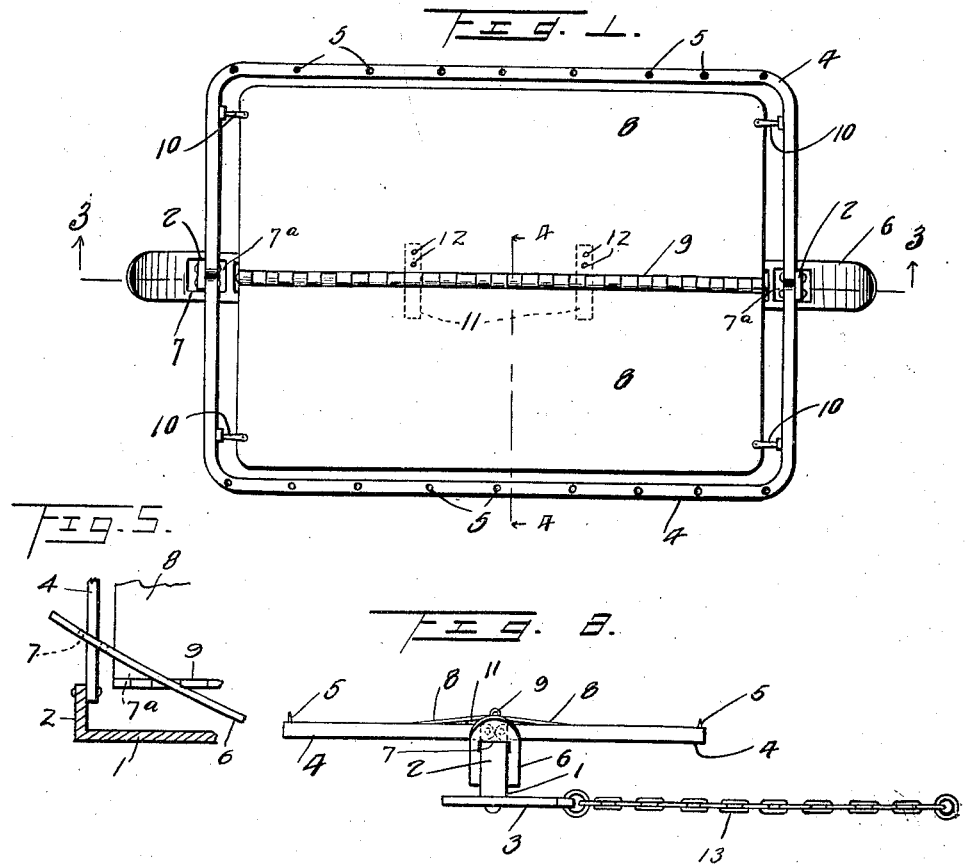
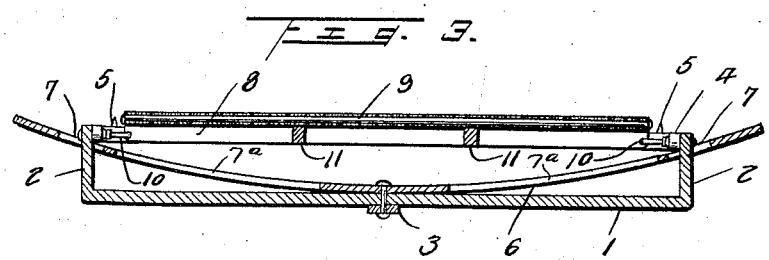
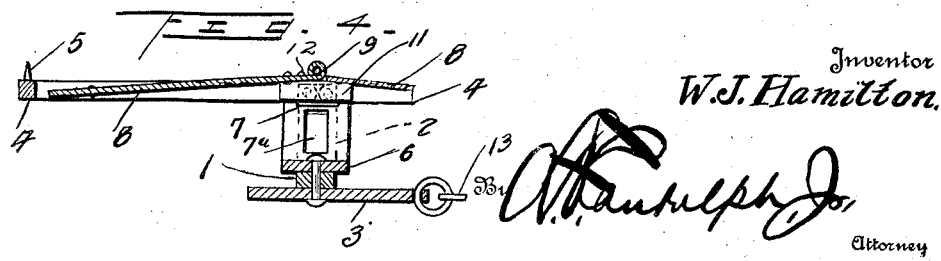
Inventor
W. J. Hamilton.
Attorney Patented Feb. 12, 1924.

1,483,800

UNITED STATES PATENT OFFICE.

WILLIAM JOSEPH HAMILTON, OF CHOKOLOSKEE, FLORIDA.

TRAP.

Application filed December 14, 1922. Serial No. 606,912.

*To all whom it may concern:*

Be it known that I, WILLIAM J. HAMILTON, a citizen of the United States, residing at Chokoloskee, in the county of Lee and State of Florida, have invented certain new and useful Improvements in Traps; and I do hereby declare the following to be a full, clear, and exact description of the invention, such as will enable others skilled in the art to which it appertains to make and use the same.

This invention relates to animal traps of the type embodying coacting pivoted jaws, an operating spring and a hinged trip, and has for its object the provision of an improved structure whereby to simplify the construction, render the action more certain and positive and prevent escape of the animal after being caught.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Figure 1 is a top plan view of a trap embodying the invention, showing the same set, Figure 2 is an end view, Figure 3 a section on the line 3—3 of Figure 1, and Figure 4 is a sectional view taken on the plane indicated by the line 4—4 of Figure 1.

Figure 5 is a detail view showing the inner corners of the trip plates extending through the slot in one of the jaws when the trap is sprung.

Corresponding and like parts are referred to in the following description and designated in the several views of the drawings by like reference characters.

The trap embodies a frame which, as shown, consists of a bar 1 having its ends or lugs 2 upturned, and a crosspiece 3 disposed centrally of the bar 1 and adapted to have a chain or other connection attached thereto for preventing the animal when caught from limping off with the trap. Companion jaws 4 are pivoted to the upturned ends 2 of the frame so as to swing outwardly and downwardly in opposite directions. The gripping elements of the jaws are toothed as indicated at 5 so as to prevent the animal from freeing itself when caught. A leaf spring 6 is attached midway of its ends to the upper side of the frame 1 and its end portions curve upwardly and are provided with longitudinal slots 7 which are adapted to receive opposite elements of the jaws 4, when the trap is sprung and the jaws are closed.

A trip coacts with the jaws to hold them open when the trap is set. This trip consists of complemental plates 8 hinged at their inner or abutting edges as indicated at 9. Each of the plates 8 is provided with outwardly disposed journals 10 which obtain bearings in the end elements of the jaws. It will thus be understood that the plates 8 open and close with the jaws and when the latter are closed, the inner corner portions of the plates extend through the slots 7 and 7ª of the spring 6. Blocks 11 are disposed upon the lower side of the trip and overlap the joint formed between the plates 8 and are attached as by rivets 12 to one of said plates and are free of the companion plate but in contact therewith when the trap is set. The blocks 11 function as stops to limit the upward movement of the plates 8 at their jointed edges, thereby holding the trap set. The blocks 11 in no wise prevent the plates 8 from breaking joint downward and the springing of the trap when pressure is exerted upon the trip, as when an animal steps thereon. When the trap is set, the hinge joint 9 is slightly above a straight line passing through corresponding journals 10. As soon as the joint 9 is moved downwardly beyond the straight lines passing through the journals 10, the spring reacts and snaps the jaws and plates to grip and hold the animal. To permit the trap to be anchored in position, a chain 13 is secured to the cross piece 3.

What is claimed is:

1. A trap having a bar provided with upturned lugs adjacent the ends thereof, an operating leaf spring secured to the bar intermediate the ends of the bar, coacting jaws pivoted to said lugs, trip plates hinged together and surrounded and carried by the jaws, and said spring being slotted adjacent opposite ends to normally engage said lugs and to receive the adjacent corner portions of the trip plate when the trap is sprung.

2. A trap having a bar provided with upturned lugs adjacent the ends thereof, an operating leaf spring secured to the bar intermediate the end of the bar, coacting jaws pivoted to said lugs, trip plates hinged together on an axis located above the axes of the jaws, said jaws surrounding and carrying said trip plates, said jaws in a set position adapted to assume positions in downwardly divergent relation to each other, stops carried by one of the trip plates and engageable by the other trip plate to limit movement of the trip plate to the aforesaid position, and said spring being slotted adjacent opposite ends to normally engage said lugs and to receive the adjacent corner portion of the trip plate when the trap is sprung.

In testimony whereof I affix my signature in presence of two witnesses.

WILLIAM JOSEPH HAMILTON.

Witnesses:
J. MENEFEE,
BRUCE STORTER.